United States Patent
Rouy

(10) Patent No.: US 11,537,834 B2
(45) Date of Patent: Dec. 27, 2022

(54) SMART CARD

(71) Applicant: STMicroelectronics (Rousset) SAS, Rousset (FR)

(72) Inventor: Olivier Rouy, Peynier (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 0 days.

(21) Appl. No.: 17/521,524

(22) Filed: Nov. 8, 2021

(65) Prior Publication Data

US 2022/0156542 A1 May 19, 2022

(30) Foreign Application Priority Data

Nov. 16, 2020 (FR) ...................................... 2011736

(51) Int. Cl.
*G06K 19/07* (2006.01)
*G06K 19/077* (2006.01)
*G06Q 20/40* (2012.01)
*H01Q 1/22* (2006.01)

(52) U.S. Cl.
CPC ..... *G06K 19/0718* (2013.01); *G06K 19/0723* (2013.01); *G06K 19/07705* (2013.01); *G06Q 20/40145* (2013.01); *H01Q 1/2225* (2013.01)

(58) Field of Classification Search
CPC ........... G06K 19/0718; G06K 19/0723; G06K 19/07705; G06Q 20/40145; H01Q 1/2225
USPC ...................................................... 235/380
See application file for complete search history.

(56) References Cited

U.S. PATENT DOCUMENTS

| | | | |
|---|---|---|---|
| 9,230,255 B1 | 1/2016 | Hanmer | |
| 9,978,009 B1* | 5/2018 | Geist | ................... G06K 19/0727 |
| 2016/0345627 A1* | 12/2016 | Liu | ......................... A24F 40/95 |
| 2019/0244210 A1 | 8/2019 | Cheng | |
| 2020/0356745 A1* | 11/2020 | Yeh | .......................... G06F 21/32 |
| 2021/0406631 A1* | 12/2021 | Jang | ..................... G06K 19/077 |

FOREIGN PATENT DOCUMENTS

GB 2563599 A 12/2018

OTHER PUBLICATIONS

INPI Search Report and Written Opinion for FR 2011736 (priority FR appl for instant US filing) dated Jul. 23, 2021 (10 pages).

* cited by examiner

*Primary Examiner* — Michael G Lee
*Assistant Examiner* — David Tardif
(74) *Attorney, Agent, or Firm* — Crowe & Dunlevy

(57) ABSTRACT

A smart card includes a first circuit delivering a power supply voltage and a second circuit coupled to the first circuit by an electrical conductor and powered with the power supply voltage. A light-emitting diode has a first terminal coupled to the electrical conductor and a second terminal coupled to a first terminal of the second circuit. During a first operating phase, the first circuit delivers a first value of the power supply voltage and the second circuit applies a first voltage to the first terminal. During a second operating phase, the first circuit delivers a second value of the power supply voltage and the second circuit applies a second voltage to the first terminal.

33 Claims, 3 Drawing Sheets

SMART CARD

PRIORITY CLAIM

This application claims the priority benefit of French Application for Patent No. 2011736, filed on Nov. 16, 2020, the content of which is hereby incorporated by reference in its entirety to the maximum extent allowable by law.

TECHNICAL FIELD

The present disclosure generally concerns electronic devices and, more specifically, smart cards.

BACKGROUND

Many applications use smart cards (for example, payment cards, transport cards, personal identification cards, etc.). Among current microcircuit cards, cards equipped with a biometric sensor are particularly known. The biometric sensor typically enables to perform identity verifications, for example, for each use of the card.

There is a need to improve current smart cards, particularly current smart cards comprising a biometric sensor. For example, it would be desirable for a smart card to be able to display information for a user.

SUMMARY

An embodiment overcomes all or part of the disadvantages of current smart cards, particularly, current smart cards comprising a biometric sensor.

An embodiment provides a smart card comprising: a first circuit configured to deliver a power supply voltage from a supply power received by the card; a second circuit coupled to the first circuit by an electrical conductor and configured to be powered with the power supply voltage; and a light-emitting diode having a first terminal coupled to the electrical conductor and a second terminal coupled to a first terminal of the second circuit; wherein, during a first operating phase, the first circuit is configured to deliver a first value of the power supply voltage and the second circuit is configured to apply a first voltage on the first terminal of the second circuit and, during a second operating phase, the first circuit is configured to deliver a second value of the power supply voltage and the second circuit is configured to apply a second voltage to the first terminal of the second circuit.

An embodiment provides a method of controlling a light-emitting diode of a smart card comprising a first circuit and a second circuit coupled by an electrical conductor, the light-emitting diode having a first terminal coupled to the conductor and a second terminal coupled to a first terminal of the second circuit, the method comprising the steps of: during a first operating phase: delivering, by the first circuit, a power supply voltage at a first value from a supply power received by the smart card; powering of the second circuit with the power supply voltage; and applying, by the second circuit, a first voltage to the first terminal of the second circuit; and during a second operating phase: delivering, by the first circuit, the power supply voltage at a second value based on the supply power received by the smart card; powering of the second circuit with the power supply voltage; and applying, by the second circuit, a second voltage to the first terminal of the second circuit.

According to an embodiment, the first and second circuits are configured to communicate via said electrical conductor during the first phase.

According to an embodiment, during the first phase, the first and second circuits are configured to implement a switching of the voltage of the electrical conductor between a null value and the first value of the power supply voltage.

According to an embodiment, during the first phase, the first circuit or the second circuit are, preferably the first circuit is, configured to implement one or a plurality of switching of the voltage of the electrical conductor between the zero value and the second value of the power supply voltage.

According to an embodiment, the second value of the power supply voltage is greater than the first value of the power supply voltage.

According to an embodiment, the second value of the power supply voltage is greater than a turn-on threshold of the diode, and the first value of the power supply voltage is smaller than the turn-on threshold of the diode.

According to an embodiment, the second value of the power supply voltage is smaller than a maximum power supply voltage of the second circuit.

According to an embodiment, the smart card further comprises a biometric sensor, preferably a fingerprint sensor, configured to be powered with the power supply voltage delivered by the first circuit.

According to an embodiment, the second circuit and the biometric sensor are configured to communicate with each other.

According to an embodiment, the sensor is configured to operate with a power supply voltage comprised within a range of values smaller than the second value and comprising the first value, the sensor being further configured to withstand a power supply voltage at the second value.

According to an embodiment, the first circuit is further configured to set the electrical conductor to a high-impedance state to synchronize a switching, by the second circuit, from the first voltage to the second voltage on the first terminal of the second circuit.

According to an embodiment, the first terminal is the anode of the diode, the second terminal is the cathode of the diode, the first voltage is equal to the power supply voltage at the first value and the second voltage is null.

According to an embodiment, the first terminal is the cathode of the diode, the second terminal is the anode of the diode, the first voltage is null, and the second voltage is equal to the power supply voltage at the second value.

According to an embodiment, the card further comprises an additional electrical conductor coupling the first circuit to the second circuit, and an additional light-emitting diode having a first terminal coupled to the additional electrical conductor and a second terminal coupled to the first terminal of the second circuit.

According to an embodiment, the power supply voltage is received via an electromagnetic field emitted by a card reader or via a direct electrical contact of the smart card with a card reader.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DETAILED DESCRIPTION

Like features have been designated by like references in the various figures. In particular, the structural and/or functional features that are common among the various embodiments may have the same references and may dispose identical structural, dimensional and material properties.

For the sake of clarity, only the steps and elements that are useful for an understanding of the embodiments described herein have been illustrated and described in detail. In particular, data exchanges between a smart card and a card reader, as well as the provision of a supply power by a reader to a smart card, either via an electromagnetic field emitted by the reader and received by the card, or by a direct electrical contact between the reader and the card, have not been detailed, the described embodiments, implementation modes, and variants being compatible with usual data exchanges between a card and a reader and with the usual supplies of power by a reader to a card.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless otherwise specified, when reference is made to absolute positional qualifiers, such as the terms "front", "back", "top", "bottom", "left", "right", etc., or to relative positional qualifiers, such as the terms "above", "below", "upper", "lower", etc., or to qualifiers of orientation, such as "horizontal", "vertical", etc., reference is made to the orientation shown in the figures.

Unless specified otherwise, the expressions "around", "approximately", "substantially" and "in the order of" signify within 10%, and preferably within 5%.

Figure 1:
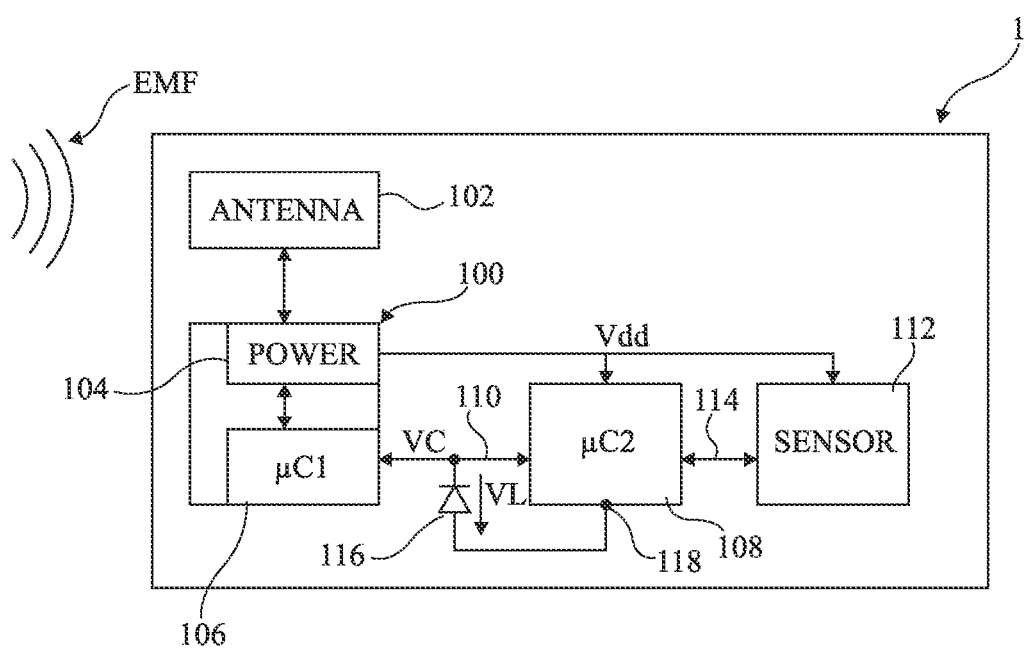
FIG. 1 very schematically shows in the form of blocks an embodiment of a smart card communicating with a reader.

FIG. 1 very schematically shows in the form of blocks an embodiment of a smart card 1 communicating with a reader (not shown). Card 1, for example, is a payment card, a transport card, a personal identification card, etc. The reader, for example, is a payment terminal, a transport ticket validation terminal, an access control terminal, etc.

The reader is configured to emit an electromagnetic field EMF, for example, a radio frequency field having wavelengths, for example, in the range from 3 kHz to 3 GHz.

When card 1 is located within range of the reader, it receives or captures field EMF.

Smart card 1 comprises a circuit 100. Circuit 100 is configured to generate a power supply voltage Vdd from the field EMF received by card 1. More particularly, circuit 100 is configured to deliver a plurality of values of voltage Vdd.

For example, card 1 comprises an antenna 102 (block "ANTENNA") capturing the field EMF and delivering a voltage and a current corresponding to circuit 100. As an example, circuit 100 comprises a circuit 104 (block "POWER") configured to generate a DC voltage (DC) from the power supplied by antenna 102 to circuit 100, voltage Vdd being, for example, obtained from this DC voltage.

As an example, circuit 100 comprises a microcontroller 106 (block "µC1"). Microcontroller 106 is, for example, configured to control one or a plurality of communication modules (not shown) of circuit 100, this or these modules, for example, enabling to retromodulate the received field EMF to transmit data to the reader and, for example, to demodulate the received field EMF to receive data from the reader. Microcontroller 106 is, for example, configured to control circuit 104.

In the example of FIG. 1, card 1 receives electrical energy for its power supply, that is, a supply power, due to the field EMF emitted by the reader.

In another example, not illustrated, card 1 receives an electrical supply power delivered by the reader due to an electrical contact between the reader and card 1. In this other example, card 1 may comprise no antenna 102. In this other example, circuit 100 is configured to generate voltage Vdd that is capable of taking on a plurality of values based (i.e., depending) on the electrical power supplied by the reader received by card 1. For example, circuit 104 is configured to receive a DC voltage available on an electrical contact of card 1, with voltage Vdd, for example, being obtained from this DC voltage. In this other example, card 1, for example, comprises a communication module controlled by its microcontroller 106 and configured to exchange data with the reader via signals transmitted between card 1 and the reader via electrical contacts between card 1 and the reader.

In still another example, not illustrated and corresponding to the combination of the two above examples, card 1 is configured to receive a supply power via an electromagnetic field emitted by a reader, but also via an electrical contact with a reader. Card 1 is also configured to exchange data with a reader via the electromagnetic field emitted by the reader, but also via electrical signals transmitted between card 1 and the reader via electrical contacts between card 1 and the reader.

According to an embodiment, circuit 100, for example, its microcontroller 106, comprises a secure element (not shown) having data of identification of the holder of card 1 stored therein.

Card 1 further comprises a circuit 108 (block "µC2"), for example, a microcontroller 108. Microcontroller 108 is powered with voltage Vdd.

At least one electrical conductor, typically a wire, couples circuit 100, for example, its microcontroller 106, to microcontroller 108. In FIG. 1, a single electrical conductor 110 has been shown. Conductive wire 110 has an end connected to circuit 100, for example, to microcontroller 106, preferably to an input/output of GPIO ("General Purpose Input Output") type of circuit 100 or of its microcontroller 106.

Circuits 100 and 108 are configured to communicate with each other via the electrical conductors coupling them, particularly via conductor 110.

For example, on each of the conductive wires, particularly wire 110, via which circuits 100 and 108 communicate, on the one hand circuit 100 or its microprocessor 106, and/or, on the other hand, microcontroller 108, are configured to switch a voltage on the wire between a null low value and a high value equal to the current value of voltage Vdd. For example, during a transmission of a bit between circuits 100 and 108 via conductor 110, when a voltage VC on the wire is null, this codes a first binary state of the transmitted bit, and when this voltage VC is equal to Vdd, this codes a second binary state of the transmitted bit.

According to an embodiment, card 1 comprises a biometric sensor 112 (block "SENSOR"). Preferably, sensor 112 is a fingerprint sensor. Sensor 112 is powered with voltage Vdd. Further, sensor 112 and microcontroller 108 are configured to communicate with each other, for example, via one or a plurality of conductive wires 114 coupling circuits 108 and 112, a single conductive wire 14 being shown in FIG. 1. As an example, a voltage on each wire 114 may be switched between a null low value and a high value equal to the current value of voltage Vdd, to respectively code a first binary state and a second binary state of a bit transmitted over this wire 114.

Card 1 further comprises a light-emitting diode or LED 116. LED 116 has a first terminal, for example, its cathode in FIG. 1, coupled, for example, connected, to conductive wire 110 and a second terminal, for example its anode in FIG. 1, coupled, for example connected, to a terminal 118 of circuit 108.

In a first operating phase, circuit 100 is configured to deliver voltage Vdd at a first value V1.

Preferably, value V1 is such that microcontroller 108 is correctly powered, that is, microcontroller 108 is capable of implementing its various functionalities when it is powered with voltage Vdd at value V1. In other words, microcontroller 108 is configured to be powered with a voltage between a high value VH1 and a low value VL1, and value V1 is between these values VL1 and VH1.

Similarly, preferably, sensor 112 is correctly powered with voltage Vdd at value V1, that is, sensor 112 is capable of implementing its various functionalities when it is powered with voltage Vdd at value V1. In other words, sensor 112 is configured to be powered with a voltage between a high value VH2 and a low value VL2, and value V1 is between these values VL2 and VH2.

A voltage at value V1 is, for example, not sufficient, if it is applied across LED 116, for LED 116 to emit light. In other words, value V1 is smaller than the turn-on threshold Vth of LED 116.

Further, during this first operating phase, circuit 108 is configured to apply a first voltage to its terminal 118. The first voltage applied to terminal 118 during the first phase, which might at most be equal to the power supply voltage Vdd of circuit 108, that is, to V1 during the first phase, is determined so that LED 116 does not turn on whatever the value of voltage VC on wire 110. More particularly, in the example of FIG. 1 where the anode of LED 116 is coupled to terminal 118, this first voltage is the null voltage. Thus, whatever the value of voltage VC during the first phase, that is, be voltage VC null or equal to V1, the voltage VL across LED 116, referenced to the cathode of LED 116, is null or negative. Voltage VL is thus smaller than the turn-on threshold Vth of LED 116, which does not turn on.

According to an embodiment, the first operating phase of card 1 corresponds to a phase of communication between circuits 106 and 108, during which data are exchanged between these circuits 106 and 108, particularly via conductor 110. Preferably, the communication between microcontroller 108 and sensor 112 also occurs during the first phase.

In a second operating phase, circuit 100 is configured to deliver voltage Vdd at a second value V2. Value V2 is greater than value V1.

Preferably, value V2 is such that microcontroller 108 is correctly powered, that is, microcontroller 108 is capable of implementing its various functionalities when it is powered with voltage Vdd at value V2. In other words, value V2 is between values VL1 and VH1.

However, preferably, voltage Vdd at value V2 does not enable to correctly power sensor 112. In other words, value V2 is, for example, greater than value VH2. Thus, when voltage Vdd is at value V2, sensor 112 is, for example, not capable of implementing its functionalities.

Further, value V2 is determined in such a way that, when voltage Vdd is at value V2, sensor 112 is not deteriorated or destroyed by this value V2 of power supply voltage Vdd. In other words, sensor 112 is configured to withstand power supply voltage Vdd at value V2.

Value V2 is further greater than the turn-on voltage Vth of LED 116. In other words, a voltage at value V2 is sufficient, if it is applied across LED 116, for LED 116 to emit light.

Further, during this second operating phase, circuit 108 is configured to apply a second voltage to its terminal 118. More particularly, in the example of FIG. 1 where the anode of LED 116 is coupled to terminal 118, this second voltage is power supply voltage Vdd, which is then equal to V2 during the second operating phase. Thus, according to the value of voltage VC during the second phase, that is, according to whether voltage VC is null or equal to V2, the voltage VL across LED 116 is respectively equal to V2 or null. Since value V2 is greater than the turn-on threshold Vth of LED 116, this results in that circuit 100 and/or circuit 108 controls phases of light emission or of no light emission by LED 116, by switching voltage VC on wire 110 between the null value and value V2. Thus, LED 116 may be used to supply information to a user of card 1, for example, to indicate that card 1 has recognized the user's fingerprint by emitting light, or for example to sequence an acquisition of reference biometric data by the sensor during an enrollment phase.

According to an embodiment, the second operating phase of card 1 corresponds to a phase of control of LED 116. During this second phase, no data are exchanged between circuits 106 and 108, in particular via conductor 110. Preferably, during the second phase, card 1 does not communicate with the reader. According to an embodiment, circuit 108 is configured to implement, during the second operating phase, a low-consumption mode, for example, a standby mode, where circuit 108 is capable of holding the second voltage on terminal 118.

In card 1, conductor 110 enables not only circuits 106 and 108 to communicate with each other during a first operating phase, but also to control LED 116 during a second operating phase. This is particularly advantageous since the number of inputs/outputs of circuit 100, for example, of its microcontroller 106, is generally smaller and limited, for example, smaller than or equal to 4.

Further, due to the fact that circuit 108 is configured to apply the first voltage to its terminal 118 during the first phase, this enables to prevent the emission of light by LED 116 during a first operating phase, despite the communication between circuits 100 and 108 via conductor 110.

The fact for circuit 100 to be configured to deliver voltage Vdd at value V1 during the first operating phase enables to ensure the correct operation of sensor 112, and also to consume less energy than during a second phase where voltage Vdd is at value V2.

Figure 2:
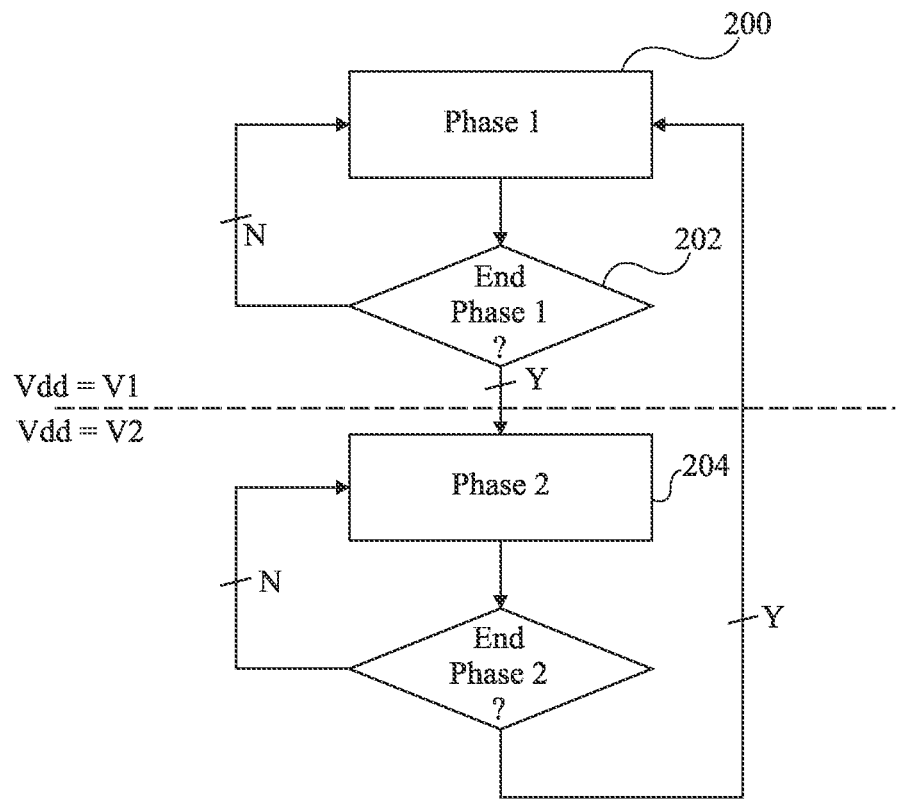
FIG. 2 is a timing diagram illustrating an implementation mode of a method in a smart card of the type of that of FIG. 1.

FIG. 2 is a timing diagram illustrating an implementation mode of a method in a card of the type of that in FIG. 1. It is here considered as an example that the method is implemented in the card 1 described in relation with FIG. 1.

At a step 200 (block "Phase 1"), the circuit 100 of card 1 delivers the voltage Vdd for powering circuit 108 and sensor 112 at value V1. During this step, circuit 108 delivers the first voltage on its terminal 118, so that the LED 116 connected between terminal 118 and conductor 110 remains off. Step 200 thus corresponds to the first operating phase described in relation with FIG. 1.

At a next phase 202 (block "End Phase 1?"), circuits 100 and 108 verify whether the first operating phase is over or, in other words, whether step 200 is over. More particularly, circuits 100 and 108 determine whether a second operating phase must start. As an example, only one of circuits 100 and 108, preferably circuit 100, verifies whether the first phase is over and, possibly, then notifies the other circuit thereof.

If the first phase in not over (output N of block 202), card 1 remains in the first operating phase, with voltage Vdd equal to equal to V1 and the first voltage on terminal 118.

If the first phase is over and if card 1 must enter a second operating phase (output Y of block 202), the method carries on at a step 204 ("Phase 2" block).

As an example, the passing to step 204 is decided by circuit 100 and is indicated to circuit 108 by circuit 100, for example via a specific signal transmitted over conductor 110. It is also possible for the passing to step 204 to be decided by circuit 108 and to be indicated to circuit 100 by circuit 108, for example via a specific signal transmitted over conductor 110. However, preferably, circuit 100 determines the passing to a second phase and indicates it to circuit 108. Indeed, circuit 100 is capable of synchronizing the implementation of a second phase and the phases of communication of card 1 with the reader, so that the second phase is implemented at a time when card 1 and the reader do not communicate, which enables to limit the general power consumption in the card.

At step 204, circuit 100 delivers voltage Vdd at value V2. Further, circuit 108 applies the second voltage to its terminal 118. Thus, the emission or not of light by LED 116 is controlled by the value of voltage VC on wire 110, as previously described in relation with FIG. 1.

At a next step 206 (block "End Phase 2?"), circuits 100 and 108 verify whether the second operating phase is over or, in other words, whether step 204 is over. More particularly, circuits 100 and 108 determine whether a new first operating phase must start. As an example, the end of the second phase is decided by circuit 100 which indicates the end of the second phase to circuit 102, for example, due to a specific signal transmitted via conductor 110.

If the second phase is not over (output N of block 206), card 1 remains in the second operating phase, with voltage Vdd equal to V2 and the second voltage on terminal 118.

If the second phase is over (output Y of block 206), the method carries on, for example, with a new step 200, or new first phase.

Figure 3:
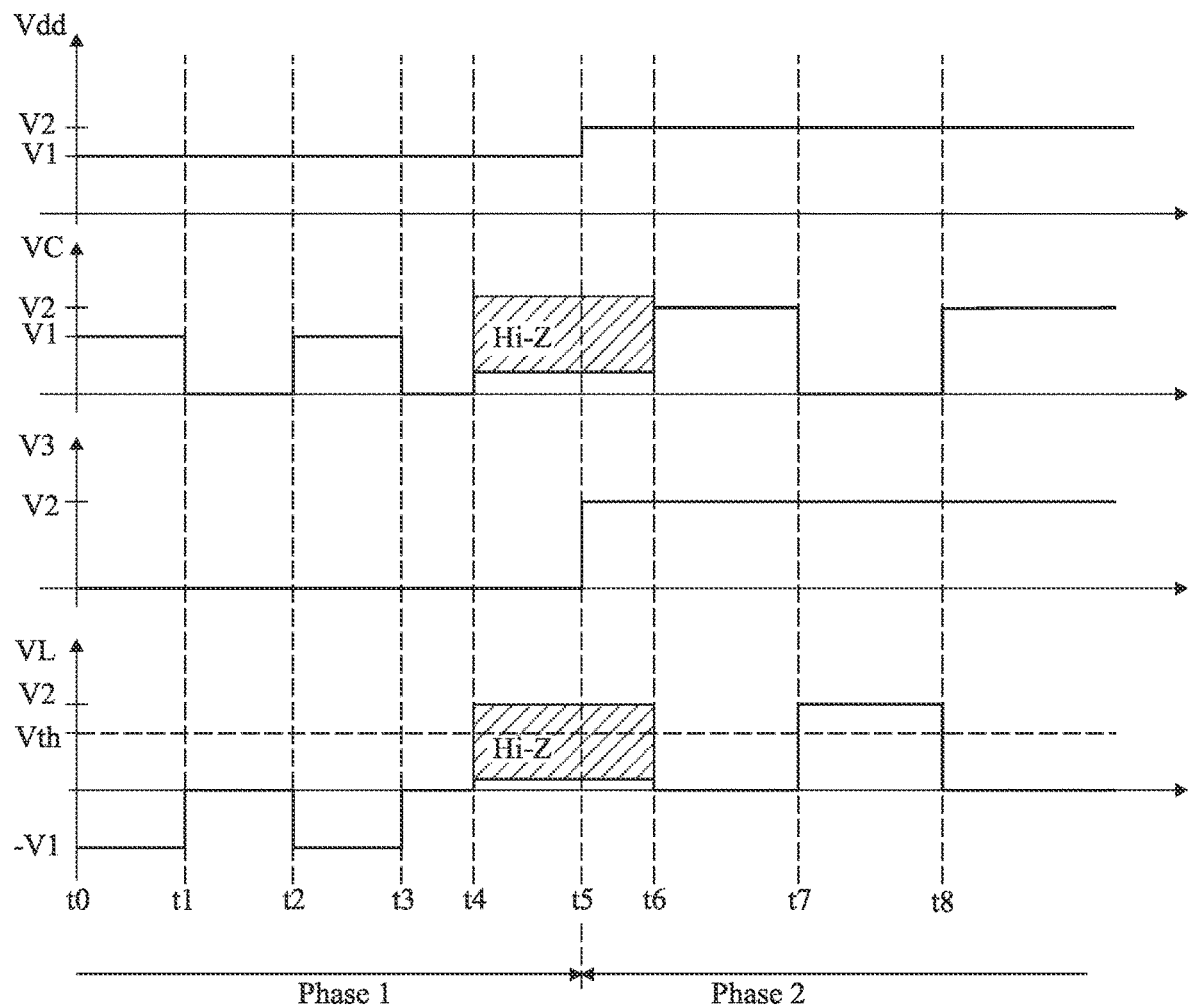
FIG. 3 shows timing diagrams illustrating an example of implementation of the method of FIG. 2, by the smart card of FIG. 1.

FIG. 3 shows timing diagrams of voltage Vdd, of voltage VC, of a voltage V3 on terminal 118, and of the voltage VL across LED 116, these timing diagrams illustrating an example of implementation of the method of FIG. 2, by the card 1 of FIG. 1.

At a time t0, card 1 is in a first operating phase (step 200, FIG. 2—phase 1, FIG. 3). Thus, voltage Vdd is at value V1 and voltage V3 is null.

In this example, at time t0, the voltage VC on conductor 110 is equal to Vdd, that is, equal to V1. As a result, voltage VL is negative and equal to—V1, and LED 116 remains off.

At a next time t1, card 1 is still in the first operating phase, and voltage VC is switched, for example, to transmit a new bit over conductor 110.

In this example, at time t1, voltage VC is switched to the null value. As a result, voltage VL switches to the null value, and LED 116 remains off.

At a next time t2, card 1 is still in the first operating phase, and voltage VC is switched, for example, to transmit a new bit over conductor 110.

In this example, at time t2, the voltage VC on conductor 110 is equal to Vdd, that is, equal to V1. As a result, voltage VL is negative and equal to—V1, and LED 116 remains off.

At a next time t3, voltage VC is switched. In this example, at time t3, voltage VC is switched to the null value. As a result, voltage VL switches to the null value, and LED 116 remains off.

At a next time t4, one of circuits 100 and 108, preferably circuit 100 as indicated in relation with FIG. 2, determines that card 1 should switch to a second operating phase (output Y of step 202, FIG. 2), and notifies the other circuit thereof.

According to an embodiment, the passing from a first operating phase to a second operating phase comprises a synchronization phase comprising setting conductor 110 to a high-impedance state, as shown by a hatched area Hi-Z in FIG. 3. One of the terminals of LED 116 coupled to conductor 110 is then also in a high-impedance state. LED 116 thus remains off. As an example, the setting of conductor 110 to a high-impedance state is controlled by circuit 100 and enables to indicate to the circuit 108 that it can change the value of voltage V3 on terminal 118 without causing a light emission by LED 116.

At a next time t5, marking the beginning of the second phase (step 204, FIG. 2—phase 2, FIG. 3), circuit 100 sets voltage Vdd to value V2, and circuit 108 sets voltage V3 to a determined value to enable to control the emission of light by LED 116 with voltage VC.

In this example where the anode of LED 116 is coupled to terminal 118 (FIG. 1), at time t5, circuit 108 thus switches voltage V3 to voltage Vdd or, in other words, switches voltage V3 to value V2.

At a next time t6, while card 1 is in the second operating phase, circuit 100 ends the high-impedance state of conductor 110 and switches voltage VC to a null value or to voltage Vdd equal to V2.

In this example, at time t6, voltage VC is switched to voltage Vdd, then equal to V2. Voltage VL is then null, and LED 116 remains off.

At a next time t7, card 1 still being in the second operating phase, circuit 100 or circuit 108, in this example, circuit 100, controls a phase of light emission by LED 116 by switching voltage VC.

In this example, at time t7, circuit 100 switches voltage VC to the null value. As a result, voltage VL is switched to value V2 greater than the turn-on voltage Vth of LED 116, and LED 116 turns on.

At a next time t8, card 1 still being in the second operating phase, circuit 100 of circuit 108, in this example, circuit 100, turns off LED 116 by switching voltage VC, in this example, to voltage Vdd equal to V2. As a result, voltage VL is switched to the null value, and LED 116 turns off.

Figure 4:
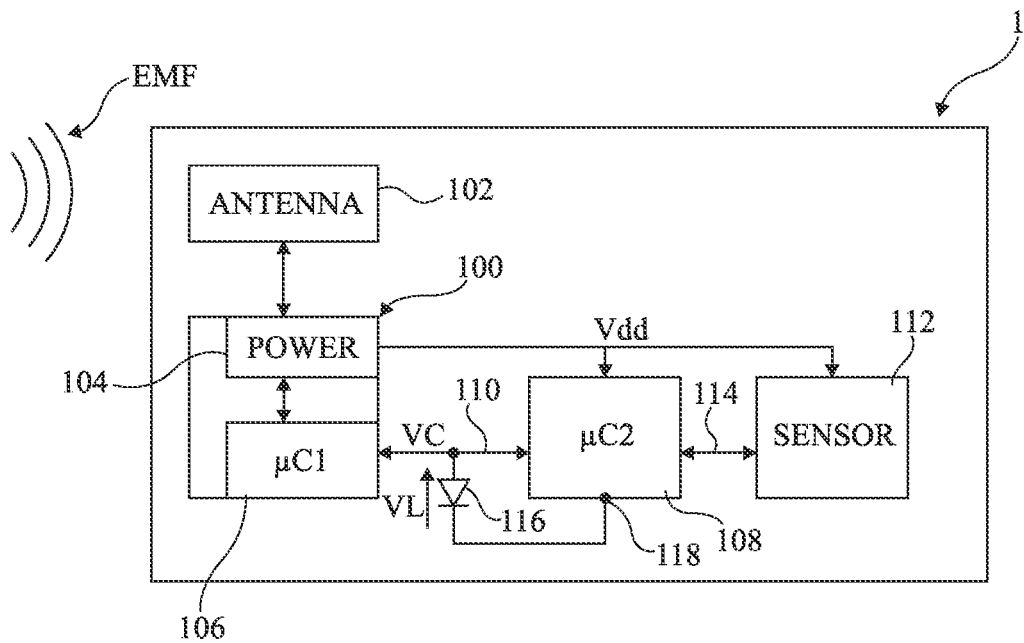
FIG. 4 very schematically shows in the form of blocks an alternative embodiment of the smart card of FIG. 1.

FIG. 4 very schematically shows in the form of blocks an alternative embodiment of the card 1 of FIG. 1. The card 1 of FIG. 4 has a great number of structural and functional elements in common with the card 1 of FIG. 1, and only the differences between these two cards 1 will here be highlighted.

The card 1 of FIG. 4 differs from that of FIG. 1 only in that the anode of LED 116 is coupled, for example, connected, to conductor 110, and in that its cathode is coupled, for example, connected, to the terminal 118 of microcontroller 108.

In the card 1 of FIG. 4, in a first operating phase, the first voltage applied to terminal 118 by circuit 108 is voltage Vdd, then equal to V1. Thereby, when voltage VC is null, voltage VL is negative and equal to—V1, whereby LED 116 remains off and, when voltage VC is equal to voltage Vdd, and thus to V1, voltage VL is null, whereby LED 116 remains off. AS a summary, during the first operating phase, LED 116 remains off, even if circuits 100 and 108 communicate via conductor 110, by switching voltage VC between the null value and voltage Vdd.

In the card 1 of FIG. 4, in a second operating phase, the first voltage applied to terminal 118 by circuit 108 is the null voltage. Thereby, when voltage VC is null, voltage VL is null, whereby LED 116 remains off and, when voltage VC is equal to voltage Vdd, and thus to V2, voltage VL is at value V2 greater than the turn-on threshold Vth of LED 116, whereby LED 116 emits light. As a summary, during the second operating phase, the emission of light by LED 116 is controlled by switching voltage VC between the null value and voltage Vdd.

Figure 5:
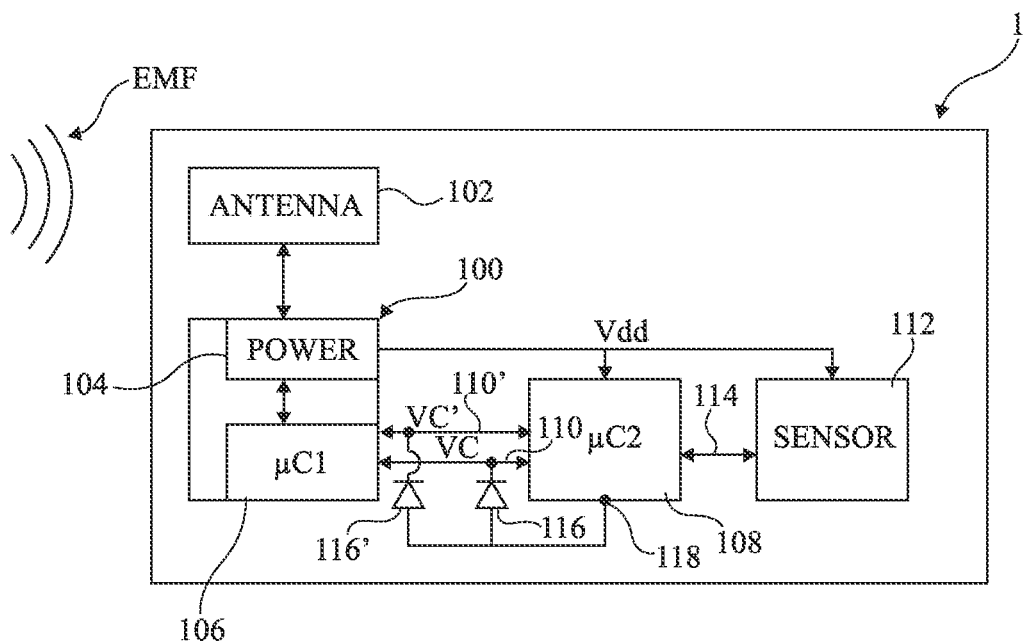
FIG. 5 very schematically shows in the form of blocks another alternative embodiment of the smart card of FIG. 1.

FIG. 5 very schematically shows in the form of blocks another alternative embodiment of the card 1 of FIG. 1. The card 1 of FIG. 5 has a very large number of structural and functional elements in common with the card 1 of FIG. 1, and only the differences between these two cards 1 will here be highlighted.

In FIG. 5, another conductor 110' coupling circuit 100, for example, its microcontroller 106, to circuit 108 is shown. Conductor 110', typically a wire, is preferably connected to a GPIO-type terminal of circuit 100 or of its microcontroller 106. Like conductor 110, conductor 110' enables circuits 100 and 108 to communicate with each other during a first operating phase, by switching a voltage VC' of conductor 110' between a null value and voltage Vdd.

The card 1 of FIG. 5 differs from that of FIG. 1 in that it comprises an additional LED 116' having a first terminal, in this example, its cathode, coupled, for example, connected, to additional conductor 110', and having a second terminal, in this example its anode, coupled, for example, connected, to the terminal 118 of circuit 108. The turn-on threshold of LED 116' may be different from the turn-on threshold Vth of LED 116. However, the turn-on threshold of LED 116' is, like that of LED 116, smaller than the value V2 of voltage Vdd.

Thus, LED 116' may be controlled, during a second operating phase, by the voltage VC' of conductor 110', similarly to the control of LED 116 by the voltage VC of conductor 110. Further, during a first operating phase, LED 116', like LED 116, remains off, be voltage VC' null or equal to voltage Vdd.

According to an embodiment, LED 116 is configured to emit red light, LED 116' being configured to emit green light.

In the previously-described embodiments, implementation modes, and variants, as an example:
the turn-on threshold of LED 116 is equal to 1.8 V; the value V1 of voltage Vdd is equal to 1.8 V; sensor 112 is configured to be correctly powered with voltage Vdd when the latter is between a low value VL2 equal to 1.62 V, and a high value VH2 equal to 1.98 V;
the value V2 of voltage Vdd is equal to 2 V; circuit 108 configured to be correctly powered with voltage Vdd, be it at value V1 or at value V2; and
in the case of the card 1 of FIG. 5, the turn-on threshold of LED 116' is, for example, smaller than that of LED 116, for example, equal to 1.7 V.

Various embodiments and variants have been described. Those skilled in the art will understand that certain features of these various embodiments and variants may be combined, and other variants will occur to those skilled in the art. In particular, it will be within the abilities of those skilled in the art to implement the card 1 described in relation with FIG. 5 in the case where LEDs 116 and 116' have their anodes coupled to the respective conductors 110 and 110' and their cathodes coupled to terminal 118.

Finally, the practical implementation of the described embodiments and variants is within the abilities of those skilled in the art based on the functional indications given hereabove.

The invention claimed is:

1. A smart card, comprising:
a first circuit configured to deliver a power supply voltage in response to a supply power received by the smart card, said power supply voltage having a first value during a first operating phase and having a second value during a second operating phase;
a second circuit coupled to the first circuit by an electrical conductor and configured to be powered with the power supply voltage; and
a light-emitting diode having a first terminal coupled to the electrical conductor and a second terminal coupled to a first terminal of the second circuit;
wherein the second circuit is configured to apply a first voltage to the first terminal of the second circuit during the first operating phase to ensure that the light-emitting diode is not illuminated regardless of a voltage present on the electrical conductor and further configured to apply a second voltage to the first terminal of the second circuit during the second operating phase that permits a selective illumination of the light-emitting diode depending on the voltage present on the electrical conductor.

2. The smart card according to claim 1, wherein the first and second circuits are configured for data communication via said electrical conductor during the first operating phase.

3. The smart card according to claim 1, wherein data communication is implemented, during the first operating phase, by having the first and second circuits switch voltage on the conductor between a null value and the first value of the power supply voltage to indicate data logic states.

4. The smart card according to claim 3, wherein at least one of the first circuit and the second circuit is configured, during the second operating phase, to switch voltage on the conductor between the null value and the second value of the power supply in order to cause the selective illumination of the light-emitting diode in connection with a communication of information to a user of the smart card.

5. The smart card according to claim 1, wherein the second value of the power supply voltage is greater than the first value of the power supply voltage.

6. The smart card according to claim 1, wherein the second value of the power supply voltage is greater than a turn-on threshold of the light-emitting diode, and wherein the first value of the power supply voltage is smaller than the turn-on threshold of the light-emitting diode.

7. The smart card according to claim 1, wherein the second value of the power supply voltage is smaller than a maximum power supply voltage of the second circuit.

8. The smart card according to claim 1, wherein the smart card further comprises a biometric sensor configured to be powered with the power supply voltage delivered by the first circuit.

9. The smart card according to claim 8, wherein the biometric sensor is a fingerprint sensor.

10. The smart card according to claim 8, wherein the second circuit and the biometric sensor are configured to communicate with each other.

11. The smart card according to claim 10, wherein the biometric sensor is configured to operate with a power supply voltage comprised within a range of values smaller than the second value and comprising the first value, the biometric sensor being further configured to withstand a power supply voltage at the second value.

12. The smart card according to claim 1, wherein the first circuit is further configured to set the electrical conductor to a high impedance state in order to synchronize a switching, by the second circuit, from the first voltage to the second voltage on the first terminal of the second circuit.

13. The smart card according to claim 1, wherein the first terminal is an anode of the light-emitting diode, the second terminal is a cathode of the light-emitting diode, the first voltage is equal to the power supply voltage at the first value and the second voltage is null.

14. The smart card according to claim 1, wherein the first terminal is a cathode of the light-emitting diode, the second terminal is an anode of the light-emitting diode, the first voltage is null and the second voltage is equal to the power supply voltage at the second value.

15. The smart card according to claim 1, further comprising an additional electrical conductor coupling the first circuit to the second circuit, and an additional light-emitting diode having a first terminal coupled to the additional conductor and a second terminal coupled to the first terminal of the second circuit.

16. The smart card according to claim 1, wherein the supply power is received via an electromagnetic field emitted by a card reader.

17. The smart card according to claim 1, wherein the supply power is received via a direct electrical contact of the smart card with a card reader.

18. A method of controlling a light-emitting diode of a smart card comprising a first circuit and a second circuit coupled by an electrical conductor, the light-emitting diode having a first terminal coupled to the conductor and a second terminal coupled to a first terminal of the second circuit, the method comprising the steps of:
  during a first operating phase:
    delivering, by the first circuit, a power supply voltage at a first value in response to a supply power received by the smart card;
    powering the second circuit with the power supply voltage; and
    applying, by the second circuit, a first voltage to the first terminal of the second circuit to ensure that the light-emitting diode is not illuminated regardless of a voltage present on the electrical conductor; and
  during a second operating phase:
    delivering, by the first circuit, the power supply voltage at a second value based on the supply power received by the smart card;
    powering of the second circuit with the power supply voltage; and
    applying, by the second circuit, a second voltage to the first terminal of the second circuit that permits a selective illumination of the light-emitting diode depending on the voltage present on the electrical conductor.

19. The method according to claim 18, further comprising data communicating between the first and second circuits via said electrical conductor during the first operating phase.

20. The method according to claim 19, wherein data communicating during the first operating phase comprises switching, by the first and second circuits, of voltage on the electrical conductor between a null value and the first value of the power supply voltage.

21. The method according to claim 20, further comprising, switching during the second operating phase, by at least one of the first circuit and the second circuit, of voltage on the electrical conductor between the null value and the second value of the power supply voltage in order to cause the selective illumination of the light-emitting diode in connection with a communication of information to a user of the smart card.

22. The method according to claim 18, wherein the second value of the power supply voltage is greater than the first value of the power supply voltage.

23. The method according to claim 18, wherein the second value of the power supply voltage is greater than a turn-on threshold of the light-emitting diode, and the first value of the power supply voltage is smaller than the turn-on threshold of the light-emitting diode.

24. The method according to claim 18, wherein the second value of the power supply voltage is smaller than a maximum power supply voltage of the second circuit.

25. The method according to claim 18, further comprising powering a biometric sensor of the smart card with the power supply voltage delivered by the first circuit.

26. The method according to claim 25, further comprising data communicating between the second circuit and the biometric sensor.

27. The method according to claim 25, wherein the biometric sensor is configured to operate with a power supply voltage comprised within a range of values smaller than the second value and comprising the first value, the biometric sensor further configured to withstand a power supply voltage at the second value.

28. The method according to claim 18, further comprising setting, by the first circuit, the electrical conductor to a high impedance state to synchronize switching, by the second circuit, from the first voltage to the second voltage on the first terminal of the second circuit.

29. The method according to claim 18, wherein the first terminal is an anode of the light-emitting diode, the second terminal is a cathode of the light-emitting diode, the first voltage is equal to the power supply voltage at the first value and the second voltage is null.

30. The method according to claims 18, wherein the first terminal is a cathode of the light-emitting diode, the second terminal is an anode of the light-emitting diode, the first voltage is null and the second voltage is equal to the power supply voltage at the second value.

31. The method according to claim 18, wherein the smart card further comprises an additional electrical conductor coupling the first circuit to the second circuit, and an additional light-emitting diode having a first terminal coupled to the additional electrical conductor and a second terminal coupled to the first terminal of the second circuit.

32. The method according to claim 18, further comprising receiving the supply power via an electromagnetic field emitted by a card reader.

33. The method according to claim 18, further comprising receiving the supply power via a direct electrical contact of the smart card with a card reader.

* * * * *